United States Patent
Hammond et al.

[11] Patent Number: 5,686,043
[45] Date of Patent: Nov. 11, 1997

[54] PROCESS AND APPARATUS FOR PRODUCING COATED METAL

[75] Inventors: John Hammond; Mark Jeremy Rowland, both of Oxfordshire, United Kingdom

[73] Assignee: Carnaudmetalbox PLC, United Kingdom

[21] Appl. No.: 525,762
[22] PCT Filed: Mar. 17, 1994
[86] PCT No.: PCT/GB94/00538
§ 371 Date: Nov. 29, 1995
§ 102(e) Date: Nov. 29, 1995
[87] PCT Pub. No.: WO94/21458
PCT Pub. Date: Sep. 29, 1994

[30] Foreign Application Priority Data
Mar. 25, 1993 [GB] United Kingdom ............ 9306243

[51] Int. Cl.$^6$ ............................................. C21D 1/62
[52] U.S. Cl. .................... 266/112; 266/114; 266/133
[58] Field of Search .......................... 266/112, 113, 266/114, 133; 148/638, 657, 658; 425/71

[56] References Cited

U.S. PATENT DOCUMENTS

| | | | |
|---|---|---|---|
| 3,027,308 | 3/1962 | Zulkoski | 266/112 |
| 3,087,198 | 4/1963 | Edwards | 425/71 |
| 3,410,734 | 11/1968 | Taylor | 148/143 |
| 4,838,526 | 6/1989 | Iida | 266/112 |

FOREIGN PATENT DOCUMENTS

| | | |
|---|---|---|
| 0312309 | 10/1988 | European Pat. Off. . |
| 0402004 | 12/1990 | European Pat. Off. . |
| 0435078 | 7/1991 | European Pat. Off. . |
| 0484711 | 5/1992 | European Pat. Off. . |
| 1448340 | 11/1973 | United Kingdom . |
| 1512145 | 4/1975 | United Kingdom . |

Primary Examiner—Scott Kastler
Attorney, Agent, or Firm—Diller, Ramik & Wight, PC

[57] ABSTRACT

An apparatus for and a method of forming a metal coated with a polymer is achieved through the provision of a reservoir containing a cooling liquid having a relative undisturbed upper surface. A metal coated with a polymer is introduced into the cooling liquid through the upper surface and is subject to quenching liquid at a temperature $T_q$ directed at the polymer coated metal substantially immediately below the cooling liquid upper surface and substantially along the entire predetermined width thereof. This achieves rapid and uniform cooling in the absence of bubble formation and/or quenching liquid surface agitation to assure desired crystalline formation of the polymer absent the polymer blemishes.

20 Claims, 2 Drawing Sheets

PROCESS AND APPARATUS FOR PRODUCING COATED METAL

This invention relates to a process and apparatus for producing coated materials comprising one or more polymer films bonded to a metal substrate. In particular, it relates to a process and apparatus for quenching such a coated metal.

BACKGROUND OF THE INVENTION

GB-1324952 describes simultaneous lamination of both sides of a metal sheet with films of a polyolefin. The resultant laminate is then reheated to a temperature above the melting point of the polyolefin to ensure adequate bonding of the polyolefin to the metal, followed by cooling of the laminate. The laminate of GB-1324952 is cooled by forced air to lower the temperature of the laminate to below the softening point of the polyolefin, then followed by a final rapid cooling under a water spray.

Quenching by the method of GB-1324952 has, however, been found to result in a partially crystalline coating. or, in this case of polypropylene, an α-form crystallinity. This is particularly to be avoided if the laminate is to be shaped into articles because discontinuities will then form in the partially crystalline coating.

EP-B-0312309 addresses the problems which arise when cooling by air below approximately 180° C. or by spray quenching from a higher temperature. The process of EP-B-0312309 reduces or eliminates the tendency of the polypropylene coating to become partially α-form crystalline by flooding the laminate with cold liquid which travels with the laminate on its coated surface. This quenching method reduces or eliminates the tendency of the laminate to form discontinuities which arise when a laminate with a polypropylene coating having a partially α-form rather than substantially smectic crystallinity is shaped.

In EP-B-0312309, flooding is achieved by cold liquid contacting the coating as a solid, unbroken and continuous flow. The cold liquid is continuously recycled and re-cooled so that it does not become warmed by the laminate as would arise if a water bath, for example, were used. Cold liquid floods the laminate preferably from distributor bars which act as a weir, so that the water travels on the laminate to activate heat exchange to ambient temperature.

The various methods of flooding the laminate which are described in EP-B-0312309 require careful control of flow rate in order to prevent splash back and uneven cooling of the laminate. Any uneven backflow of cooling liquid will lead to uneven cooling and quench marks form on the laminate. Not only are such quench marks unsightly, but uneven cooling can result in the coating having a crystalline structure.

U.S. Pat. No. 3,087,198 describes an apparatus for quenching extruded thermoplastic film. In that apparatus submerged hollow rollers are provided through which quenching water is passed at such a velocity that discharge at one end is achieved without turbulence of the surrounding quench water.

SUMMARY OF THE INVENTION

This invention seeks to provide an apparatus and process which avoid uneven cooling of coated metal and the resultant problems.

According to the invention there is provided an apparatus for producing a sheet metal coated with a polymer including means for quenching the coated metal comprising a reservoir containing cooling liquid, means for directing at least one jet of liquid at temperature $T_q$ at the coated metal beneath the surface of the cooling liquid and means for recycling the cooling liquid from the reservoir to the directing means and adjusting the temperature of the cooling liquid to the temperature $T_q$; characterised in that the directing means comprises one or more nozzles, the or each nozzle comprising an upper and a lower lip separated by a slit or a hole.

The polymer is preferably a polymeric film, in which case the apparatus further comprises means for feeding a metal sheet and a strip of polymer film to a nip, means for heating the metal sheet to a first temperature $T_1$ above the initial adhesion point of the polymeric film to cause intimate contact of the film with the metal sheet, and means for reheating the resultant coated metal to a second temperature $T_2$ to cause the film to interact with and bond to the metal sheet.

Following reheat, the coated metal may be heated and/or cooled in a heat/cool zone as described in copending UK patent application no. 9306140 so as to enter the quenching means at a substantially constant temperature $T_3$, irrespective of line speed.

The coated metal may be a laminate. The polymer is preferably a polymer film, alternatively, it may be an extrusion coating, a powder spray coat, dipped coat etc.

The use of submerged directing means has surprisingly been found to provide rapid, even and controlled cooling of the coated metal and to produce the desired amorphous structure of the polymer film.

Preferably, the directing means comprises a nozzle or a series of nozzles aligned substantially horizontally. The nozzles may each define a slit or hole which is usually inclined at an acute angle to the direction of travel of the coated metal so that each nozzle directs a jet of cool liquid into the direction of travel of the coated metal.

Alternatively, the directing means may be adjustable so that the jet may be directed at any angle between the acute angle and an angle just above horizontal. Most preferably, however, this angle is 30° below horizontal.

Preferably one of the lips of the or each nozzle is fixed and the other lip may be moved substantially vertically so as to adjust the size of the slit. Preferably, the lower lip is fixed and the upper part is moveable.

Advantageously, at least one of the lips of the or each nozzle includes means for rotating at least part of that lip towards or away from the other lip. Fine adjustment of the slit size may be achieved by this rotation. Rotation of individual lips enables fine adjustment for correction of variation between nozzles across the width of the directing means to be achieved. Usually, the rotating means comprises a substantially horizontal groove in one lip and means for deflecting a lip portion below the groove. This deflecting means may be a screw, for example.

Generally, the directing means further includes a substantially horizontal aperture behind the nozzles so that liquid at temperature Tq is first directed through the aperture and is then directed by individual nozzles.

The recycling means typically comprises a pump and heat exchanger. Additionally, the flow rate of liquid from the directing means may be adjusted, for example, by the pump or by a control valve. Typically, the flow rate may be increased with line speed, metal thickness and/or polymer film gauge. The directing means are preferably submerged by between 5 and 200 mm.

This range of submersion has been found to be most advantageous in ensuring even cooling without risk of backflow or splashback since the coated metal first contacts a plane surface of cooling liquid in the reservoir and immediately thereafter is quenched rapidly and uniformly by cold liquid directed along the coated surface of the metal. Furthermore, the use of submerged nozzles ensures optimum circulation of cooling liquid and prevents local heating of the cooling liquid in the reservoir which would arise if a simple water bath were used, for example.

According to a further aspect of the present invention, there is provided a process for producing a sheet metal coated with a polymer, including quenching the laminate rapidly and uniformly in a reservoir containing cooling liquid by directing at least one jet of liquid at temperature Tq at the coated metal beneath the surface of the cooling liquid; and recycling the cooling liquid and adjusting the temperature of the cooling liquid to the temperature $T_q$ for quenching of the coated metal; characterised by providing one or more nozzles, the or each nozzle comprising an upper and a lower lip separated by a slit or a hole; and adjusting the or each nozzle to direct the liquid jet or jets at the coated metal.

Preferably the polymer is a polymeric film and the process further comprises the steps of heating the metal sheet to a first temperature $T_1$ above the initial adhesion point of the polymeric film; applying the polymeric film to the preheated metal in a nip; and reheating the coated metal to a second temperature $T_2$ to cause the film to interact with and bond to the metal sheet. The process may also include heating and/or cooling the coated metal, in accordance with our copending patent application, prior to quenching the coated metal so that the coated metal enters the reservoir at a substantially constant temperature $T_3$, irrespective of line speed. The coated metal may be a laminate. Alternatively, the coated metal may be an extrusion coating, a powder spray coat, dipped coat etc.

According to a still further aspect of the present invention, there is provided an apparatus for quenching a sheet metal coated with a polymer, comprising a tank having a bottom wall and a side wall, adapted to contain a cooling liquid substantially filling the tank; and a distributor block mounted on the side wall of the tank below the surface of the cooling liquid and having an adjustable slot from which liquid at temperature $T_q$ may be directed at the coated metal.

BRIEF DESCRIPTION OF THE DRAWINGS

A preferred embodiment of the invention will now be described by way of example only, with reference to the drawings, in which.

DESCRIPTION OF THE PREFERRED EMBODIMENT

Figure 1:
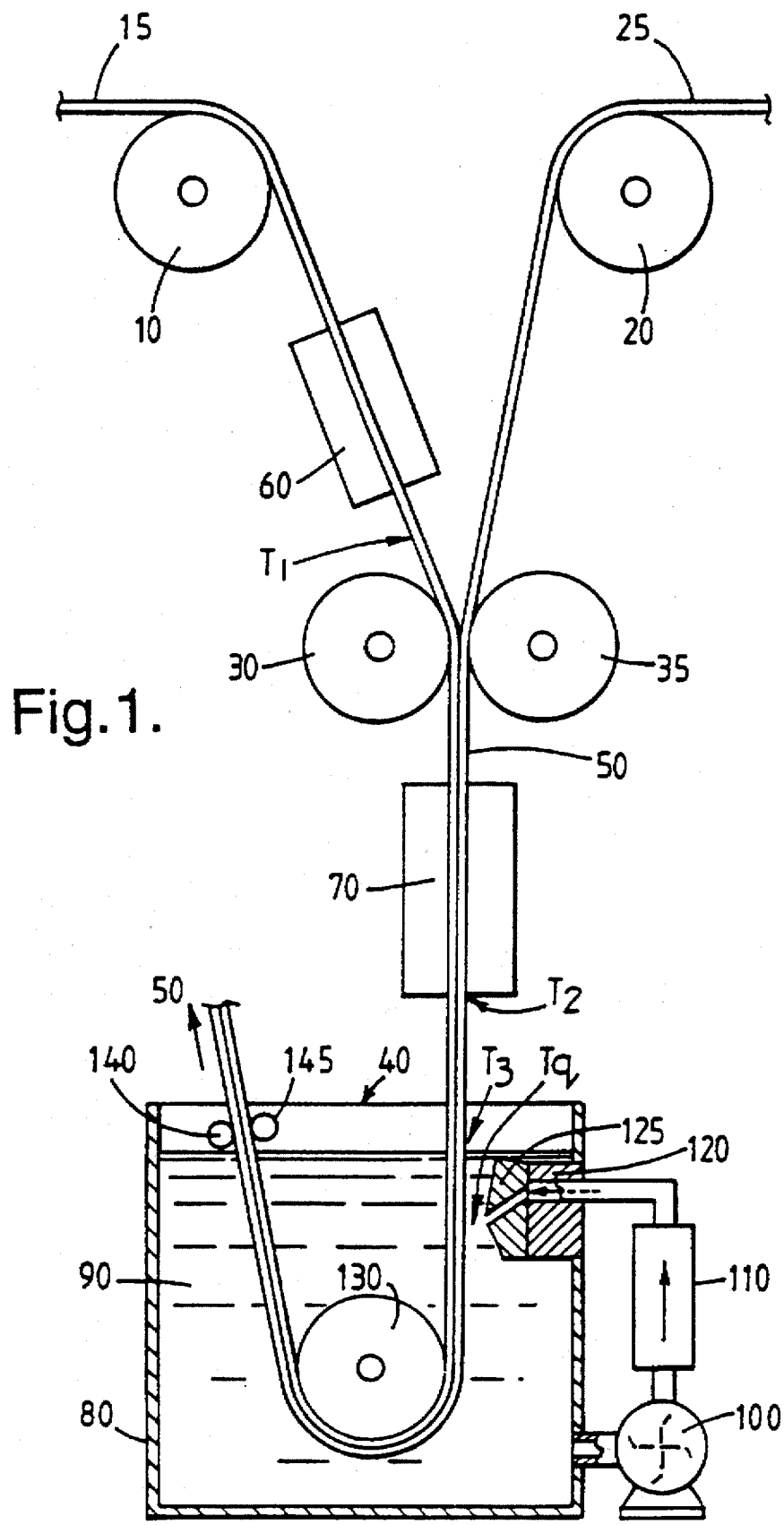
FIG. 1 is a diagrammatic sketch of an apparatus for laminating a polymeric film to a metal strip.

In FIG. 1 it can be seen that the apparatus comprises a first roll 10 over which a metal strip 15 is passed, a second roll 20 over which a strip of polymeric film 25 is passed, pinch rolls 30, 35 which bring the metal strip 15 and the polymer 25 together, and a quenching apparatus 40 which immerses the polymer/metal laminate 50 and directs a jet of cooling liquid at the laminate.

A preheater 60 is located between the roll 10 and pinch rolls 30, 35 and serves to preheat the metal strip 15 to a temperature $T_1$ above the initial adhesion point of the polymer film before laminating at the pinch rolls 30, 35. A second heater 70 is located between the pinch rolls and the quenching apparatus 40 and serves to reheat the laminate to a temperature $T_2$ which is higher than the preheat temperature $T_1$ and higher than the melting point of the polymer film. An active heat/cool zone is usually used between heater 70 and quenching apparatus 40 so as to control the temperature $T_3$ of the laminate as it enters quenching apparatus 40 so that this temperature $T_3$ remains constant irrespective of line speed.

The quenching apparatus 40 comprises a reservoir 80 for containing a coolant liquid 90, such as water, a pump 100 to draw liquid from the reservoir, a heat exchanger 110 to cool liquid delivered by the pump and a distributor apparatus 120 which receives cooled liquid from the heat exchanger 110 and delivers the liquid as jets from nozzles 125 (only one shown) onto the polymer film at quenching temperature $T_q$.

The flow rate of the liquid is varied by adjusting the pump speed or by the use of a control valve. This enables a different flow rate to be selected according to the metal thickness and/or polymer film gauge, for example, so as to achieve constant cooling irrespective of these. Flow rate may also be increased with line speed. Low line speeds do not require a high heat transfer so that a lower flow rate can be used. Similarly, the flow rate is increased when thicker metal and/or polymer gauge is used.

The quenched laminate passes round a turn roll 130 for removal from the quenching apparatus 40 and then passes through a pair of wiper rolls 140, 145 to wipe off the cooling liquid.

Figure 2:
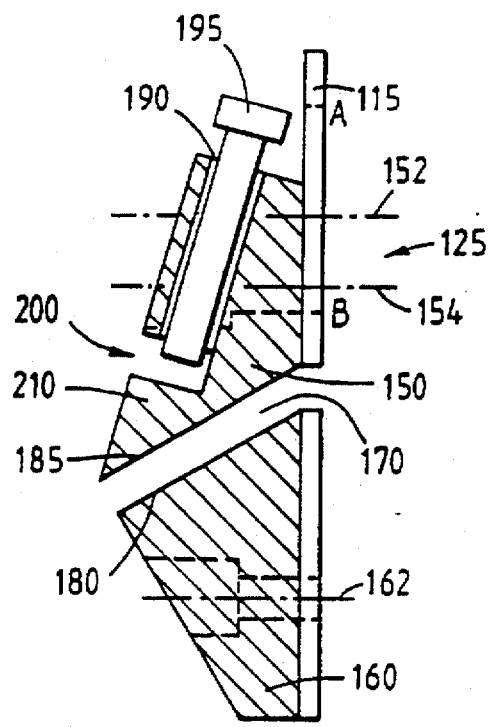
FIG. 2 is a cross section of nozzles used in the apparatus of FIG. 1.

The nozzle 125 is shown in more detail in FIG. 2, mounted on a plate 115. The nozzle comprises an upper lip 150 and lower lip 160. The upper and lower lips are spaced by a slit, or channel 170, through which liquid cooled by the heat exchanger can pass as a single jet or "fin" onto the laminate.

The width of slit 170 can be adjusted by relative movement of lips 150, 160. Generally, lower lip 160 is fixed and upper lip 150 is moveable vertically by adjustment of mounting screws in the distribution apparatus 120. Two screws at positions indicated by dotted centre-lines 152, 154 are used to mount upper lip 150 and to move it along a slot which extends between A and B on plate 115. A single screw indicated by dotted centre-line 162 fixes the lower lip to plate 115 and the rest of the distribution apparatus 120. Thus the velocity and pressure of the jet of cooled liquid can be adjusted by altering the vertically positioning of upper lip 150. It will of course be realised that the upper lip may be fixed and the lower lip moveable, or that both lips may be moveable.

Lower side 180 of slit 170 is generally inclined at 30° to the horizontal whereas upper side 185 is inclined at 32° to the horizontal. This focusses the jet further on the laminate than would a parallel sided slit.

Additional adjustment of the upper lip 150 can be achieved by movement of a screw 195 which passes through bore 190 and bears on the lower edge of a groove or recess 200. This causes portion 210 of upper lip 150 to flex and deflect. This additional adjustment can be made at ten positions along upper lip 150 and allows fine adjustment to correct any variation in the jet along the nozzle 125. Alternatively, this deflection could be achieved by hinging the upper lip for example.

The laminate 50 enters reservoir 80 at temperature $T_2$ and immediately meets the surface of cooled liquid 90. Since the surface of liquid is undisturbed, minimal or no splash-back occurs. The laminate recipes an initial quenching by the undisturbed cooled liquid but is immediately thereafter quenched by jets of liquid cooled to temperature $T_q$, positioned 50 mm below the surface.

Cooled liquid thus quenches the laminate by a combination of immersion and directing a jet of cold liquid over the laminate. There is thus no risk that a warm layer of liquid can form on the laminate as would be the case if a water bath, for example, were used. Furthermore, liquid in the reservoir 80 is continuously recycled by pump 100 and cooled by heat exchanger 110 so that liquid always contacts the laminate at temperature $T_q$ and liquid at the surface never becomes more than a few degrees warmer than this.

Whilst a single nozzle 125 with one longitudinal slit 170 has been shown in this embodiment, alternative embodiments which use a single nozzle with a plurality of slits or holes could be used, or several separate nozzles with independent slits or holes for example.

The laminate is usually quenched by jets from both sides. This is particularly advantageous when quenching a laminate of metal strip with polymeric films on both sides as shown in FIG. 3 but may also be used to cool the metal side of the laminate of FIG. 1 and to balance the forces on the laminate by application of the jets.

Figure 3:
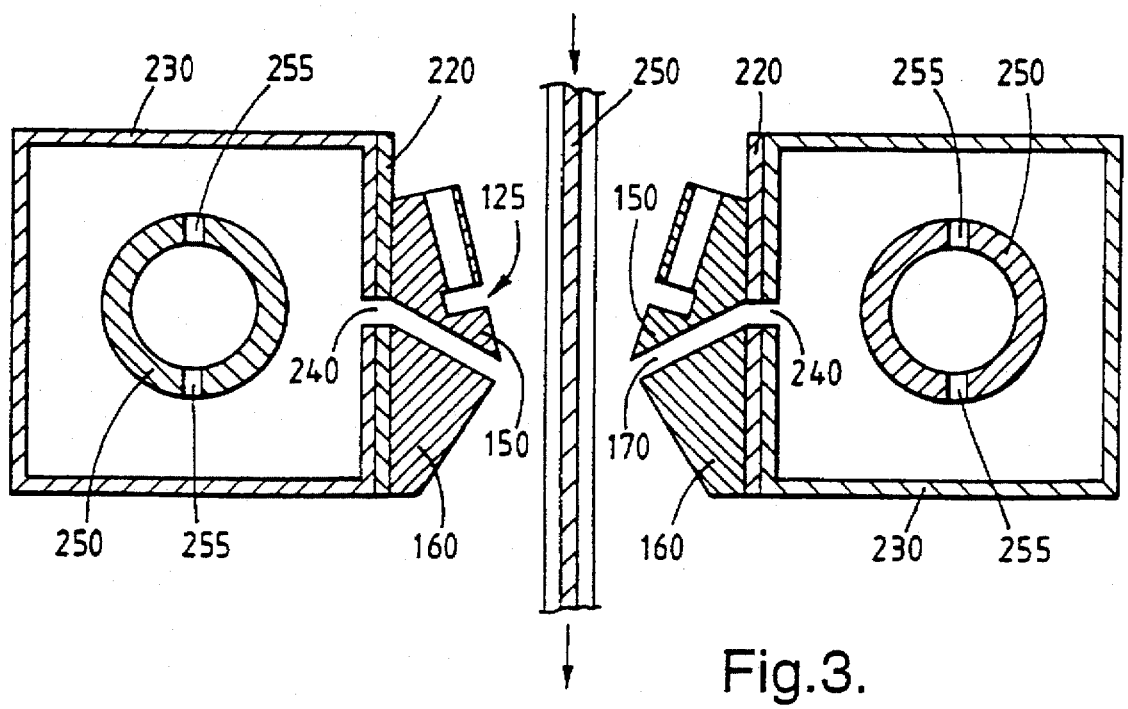
FIG. 3 is a cross section of a distribution apparatus for quenching a laminate of metal strip having polymeric films on both sides.

In FIG. 3, a three layer laminate 250 passes between nozzles 125 submerged in cooling liquid (not shown). The nozzles are each mounted on a plate 220 which in turn is mounted on a stainless steel square section plenum 230. Cooling liquid, usually water, passes along cylindrical pipes 250 and out of holes 255 into the square section plenum 230, which supplies cooling liquid to the nozzles through a slit 240 in plate 220. Constant pressure is thus maintained within plenum 230 across its horizontal width so that even flow is maintained across the nozzles 125.

Upper lip 150 can be moved up or down the plate 220, whereas lower lip 160 is fixed. The size of nozzle slit 170 can thus be varied from 1 to 15 mm.

The overall angle of the nozzle assembly can also be adjusted by rotation of the square section plenum 230 and nozzles 125. The angle chosen is typically 30° but may vary from just above horizontal to almost vertically downwards. The angle is chosen for optimum cooling whilst avoiding any risk of splash back but is less critical with the apparatus of the present invention since the nozzles are submerged.

Not only is splash back avoided with the present invention and even cooling achieved, but it is also possible to use higher velocity quench jets than was possible hitherto. Such jets enable more efficient cooling of the laminate due to better heat transfer, which in turn enables higher laminations speeds and/or thicker polymer coatings to be used.

It will be appreciated that the invention has been described above by way of example only and that changes may be made without departing from the scope of the invention.

We claim:

1. Apparatus for providing a metal coated with a polymer comprising means for defining a reservoir containing a cooling liquid having an upper surface; means for conveying a metal coated with a polymer into the cooling liquid through the cooling liquid upper surface; means for directing quenching liquid at a temperature $T_q$ at the polymer coated metal and substantially only immediately below the cooling liquid upper surface and substantially along the entire width of the polymer coated metal whereby the polymer is rapidly and uniformly quenched substantially immediately upon passing beyond the cooling liquid upper surface, means for recycling the cooling liquid from the reservoir to the quenching liquid directing means, means for adjusting the temperature of the cooling liquid to the temperature $T_q$, and said quenching liquid directing means include at least one relatively elongated substantially horizontally disposed slit.

2. Apparatus for providing a metal coated with a polymer comprising means for defining a reservoir containing a cooling liquid having an upper surface; means for conveying a metal coated with a polymer into the cooling liquid through the cooling liquid upper surface; means for directing quenching liquid at a temperature $T_q$ at the polymer coated metal and substantially only immediately below the cooling liquid upper surface and substantially along the entire width of the polymer coated metal whereby the polymer is rapidly and uniformly quenched substantially immediately upon passing beyond the cooling liquid upper surface, means for recycling the cooling liquid from the reservoir to the quenching liquid directing means, means for adjusting the temperature of the cooling liquid to the temperature $T_q$, and said quenching liquid directing means includes a plurality of spaced holes disposed in a substantially horizontal plane.

3. The apparatus as defined in claim 1 wherein the conveying means convey the polymer coated metal in a direction of travel beyond the cooling liquid upper surface, and the quenching liquid directing means direct the quenching liquid at an angle ranging between an acute angle to the direction of travel and an angle substantially just above horizontal.

4. The apparatus as defined in claim 1 wherein the quenching liquid directing means is constructed and arranged for directing the quenching liquid against a polymer of the polymer coated metal.

5. The apparatus as defined in claim 1 including means for uniting a metal strip and a polymer to form the polymer coated metal at a first position upstream of the reservoir, and means for reheating the polymer coated metal at a second position downstream from the first position and upstream of the reservoir.

6. The apparatus as defined in claim 1 including means for uniting a metal strip and a polymer to form the polymer coated metal at a first position upstream of the reservoir, and means for reheating the polymer coated metal at a second position downstream from the first position and upstream of the reservoir to a temperature $T_2$ which is higher than the adhesion temperature of the polymer.

7. The apparatus as defined in claim 1 including means for selectively heating or cooling the polymer coated metal upstream of the reservoir to maintain the polymer coated metal temperature substantially constant irrespective of the speed of the conveying means.

8. The apparatus as defined in claim 1 including means for uniting a metal strip and a polymer to form the polymer coated metal at a first position upstream of the reservoir, means for reheating the polymer coated metal at a second position downstream from the first position and upstream of the reservoir, and means downstream from the second position for selectively heating or cooling the polymer coated metal upstream of the reservoir to maintain the polymer coated metal temperature substantially constant irrespective of the speed of the conveying means.

9. The apparatus as defined in claim 1 including means for selectively variably adjusting the size of said horizontally disposed slit.

10. The apparatus as defined in claim 9 wherein said horizontally disposed slit is defined by and between an upper lip and a lower lip.

11. The apparatus as defined in claim 9 wherein said adjusting means includes means for substantially vertically moving at least one of said lips.

12. The apparatus as defined in claim 9 wherein said adjusting means includes means for rotating a part of one of said lips toward or away from the other lip.

13. The apparatus as defined in claim 9 wherein said horizontally disposed slit is submerged beneath the cooling liquid upper surface by between 5 and 200 mm.

14. The apparatus as defined in claim 9 including means for varying the flow rate of the quenching liquid.

15. The apparatus as defined in claim 2 wherein the conveying means convey the polymer coated metal in a direction of travel beyond the cooling liquid upper surface, and the quenching liquid directing means direct the quenching liquid at an angle ranging between an acute angle to the direction of travel and an angle substantially just above horizontal.

16. The apparatus as defined in claim 2 wherein the quenching liquid directing means is constructed and arranged for directing the quenching liquid against a polymer of the polymer coated metal.

17. The apparatus as defined in claim 2 including means for uniting a metal strip and a polymer to form the polymer coated metal at a first position upstream of the reservoir, and means for reheating the polymer coated metal at a second position downstream from the first position and upstream of the reservoir.

18. The apparatus as defined in claim 2 including means for uniting a metal strip and a polymer to form the polymer coated metal at a first position upstream of the reservoir, and means for reheating the polymer coated metal at a second position downstream from the first position and upstream of the reservoir to a temperature $T_2$ which is higher than the adhesion temperature of the polymer.

19. The apparatus as defined in claim 2 including means for selectively heating or cooling the polymer coated metal upstream of the reservoir to maintain the polymer coated metal temperature substantially constant irrespective of the speed of the conveying means.

20. The apparatus as defined in claim 2 including means for uniting a metal strip and a polymer to form the polymer coated metal at a first position upstream of the reservoir, means for reheating the polymer coated metal at a second position downstream from the first position and upstream of the reservoir, and means downstream from the second position for selectively heating cooling the polymer coated metal upstream of the reservoir to maintain the polymer coated metal temperature substantially constant irrespective of the speed of the conveying means.

* * * * *